United States Patent
Xu et al.

(10) Patent No.: US 9,406,945 B2
(45) Date of Patent: Aug. 2, 2016

(54) DIE CLEARANCE CONTROL FOR THIN SHEET STAINLESS STEEL BPP FORMING

(71) Applicant: GM Global Technology Operations LLC, Detroit, MI (US)

(72) Inventors: Siguang Xu, Rochester Hills, MI (US); Joseph N. Lovria, Davisburg, MI (US); Elizabeth Dicocco, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 61 days.

(21) Appl. No.: 14/466,244

(22) Filed: Aug. 22, 2014

(65) Prior Publication Data

US 2016/0056478 A1 Feb. 25, 2016

(51) Int. Cl.
| | |
|---|---|
| *H01M 8/0206* | (2016.01) |
| *H01M 8/10* | (2016.01) |
| *H01M 8/021* | (2016.01) |
| *H01M 8/0247* | (2016.01) |
| *H01M 8/02* | (2016.01) |

(52) U.S. Cl.
CPC ............ *H01M 8/0206* (2013.01); *H01M 8/021* (2013.01); *H01M 8/0247* (2013.01); *H01M 8/10* (2013.01); *H01M 2008/1095* (2013.01); *H01M 2250/20* (2013.01)

(58) Field of Classification Search
CPC . H01M 8/0206; H01M 8/10; H01M 2250/20; H01M 2008/1095; H01M 8/021; H01M 8/0247
See application file for complete search history.

(56) References Cited

U.S. PATENT DOCUMENTS

| | | | |
|---|---|---|---|
| 6,291,094 B1 * | 9/2001 | Yoshimura | H01M 8/0204 427/115 |
| 8,778,567 B1 | 7/2014 | Xu et al. | |

FOREIGN PATENT DOCUMENTS

| | | | | |
|---|---|---|---|---|
| CA | 2797160 | * | 6/2013 | .............. H01M 8/04 |
| JP | 2004-068118 | * | 3/2004 | .............. C22C 38/00 |

OTHER PUBLICATIONS

Fan (Materials Science Forum, vol. 704-705, part 2, pp. 1175-1179 Trans Tech Publications Limited 2012).*

* cited by examiner

*Primary Examiner* — Patrick Ryan
*Assistant Examiner* — Aaron Greso
(74) *Attorney, Agent, or Firm* — Quinn Law Group, PLLC

(57) ABSTRACT

A bipolar plate used in a fuel cell and a method of making a bipolar plate. The sheet is made generally from a stainless steel, and in a more preferable form from a ferritic stainless steel. In one configuration, a stamping or related metal forming tool operation will introduce a negative clearance as a way to move or otherwise reallocate a portion of the material making up the sheet into other portions as a way to reduce stretching, necking, thinning and related thickness deviations associated with the bends formed in the bipolar plate.

19 Claims, 3 Drawing Sheets

DIE CLEARANCE CONTROL FOR THIN SHEET STAINLESS STEEL BPP FORMING

BACKGROUND OF THE INVENTION

The present invention relates generally to a metal bipolar plate for use in a fuel cell environment that exhibits ease of manufacturability, and more particularly to such a bipolar plate that is easy and inexpensive to manufacture while preserving the best mechanical/structural properties possible.

In many fuel cell systems, hydrogen or a hydrogen-rich gas is supplied through a flowpath to the anode side of a fuel cell while oxygen (such as in the form of atmospheric oxygen) is supplied through a separate flowpath to the cathode side of the fuel cell. An appropriate catalyst (for example, platinum) is typically disposed to form on these respective sides an anode to facilitate hydrogen oxidation and as a cathode to facilitate oxygen reduction. From this, electric current is produced with high temperature water vapor as a reaction byproduct. In one form of fuel cell, called the proton exchange membrane or polymer electrolyte membrane (in either event, PEM) fuel cell, an electrolyte in the form of an ionomer membrane is situated between the anode and cathode to form a membrane electrode assembly (MEA) which is further layered between diffusion layers that allow both gaseous reactant flow to and electric current and water flow from the MEA. The aforementioned catalyst layer may be disposed on or as part of the diffusion layer or the membrane.

To increase electrical output, individual fuel cell units are stacked with bipolar plates disposed between the diffusion layer and anode electrode of one MEA and the diffusion layer and cathode electrode of an adjacent MEA. Typically, the bipolar plates are made from a metal or other electrically-conductive material in order to form an electrical pathway between the MEA and an external electric circuit. In such a stacked configuration, the bipolar plates separating adjacently-stacked MEAs have opposing surfaces each of which include flow channels separated from one another by raised lands. The channels act as conduits to convey hydrogen and oxygen reactant streams to the respective anode and cathode of the MEA, while the lands, by virtue of their contact with the electrically conductive diffusion layer that is in turn in electrical communication with current produced at the catalyst sites, act as a transmission path for the electricity generated in the MEA. In this way, current is passed through the bipolar plate and the electrically-conductive diffusion layer.

Because the bipolar plate operates in a high temperature and corrosive environment, conventional metals, such as plain carbon steel, may not be suitable for certain applications (such as in automotive environments) where long life (for example, about 10 years with 6000 hours of life) is required. During typical PEM fuel cell stack operation, the proton exchange membranes are at a temperature in the range of between about 75° C. and about 175° C., and at a pressure in the range of between about 100 kPa and 200 kPa (i.e., roughly one to two atmospheres) absolute. Under such conditions, plates made from alloyed metals such as stainless steel may be advantageous, as they have desirable corrosion-resistant properties. In situations where cost of fuel cell manufacture is an important consideration, metal-based bipolar plates may be preferable to other high-temperature, electrically conductive materials, such as graphite. In addition to being relatively inexpensive, stainless steel can be formed into relatively thin parts (for example, between 0.1 and 1.0 millimeters in thickness).

Of the various types of stainless steels, those with ferritic microstructures, which typically have a high chromium content and are typically devoid of nickel, exhibit body-centered cubic (BCC) crystal structure and tend to have the desirable attributes of being relatively low cost and high in corrosion resistance (the latter due to chromium oxide barrier formation). Nevertheless, their hardening curves are such that they are more susceptible to necking, thinning (both of which are measures of deviations in thickness of the surface material) and consequent cracking when exposed to conventional stamping or related metal-forming operations than their more conventional austenitic (for example, 304 stainless steel) counterparts. These difficulties are especially prevalent in single-step draw operations (for example, those involving relatively large—such as between about 200 microns and 400 microns in depth—out-of-plane deformations) where significant side wall deformation may take place. This early necking and fracture is especially prevalent in tight radii used to form the adjacent walls of the reactant flow channels. While the hardening curves of other more formable stainless steels (such as the aforementioned austenitics) generally allows for the more harsh bending conditions imposed by the conventional one-step approach, early necking and fracture from such single-step forming is also prevalent in situations where the draw depth is comparatively large (such as greater than about 400 to 500 microns).

Moreover, current bipolar plate manufacturing accounts for a high portion of overall fuel cell stack cost. While using stamped stainless steel bipolar plates would be beneficial in addressing a significant portion of this cost, the low formability of stainless steel in general (and ferritic stainless steel in particular) is a significant challenge, especially for stamping very thin (for example, 0.100 millimeters or thinner) sheets that possess the required channel strength and depth to satisfy functional requirements.

BRIEF SUMMARY OF THE INVENTION

According to an aspect of the present invention, a method of forming a metal bipolar plate for a fuel cell is disclosed. In the present context, while numerous iron-based and aluminum-based metals may be operated upon by the present method, it is especially beneficial for stainless steels in general and ferritic stainless steels in particular; the use of all such metals in the workpiece is deemed to be within the scope of the present invention. The method includes using a slight negative clearance to introduce a compressive stress along at least portions of the surface of the sheet that is being deformed by a plate-forming tool. More particularly, the method includes placing the sheet between at least two dies (or in the alternate, a punch and a die, as either variant is deemed to be the functional equivalent of one another and therefore within the scope of the present invention) is converted into the shape of a bipolar plate with numerous flow channels that can be used for the passage of fuel cell reactants (such as hydrogen and oxygen). In the present context, the sheet may be generally planar, or may have already been subjected to some pre-forming, the latter such that some non-planar (i.e., three-dimensional) attributes have already been included into its final shape. In either event, the negative clearance created by the operation of the tool dies defines a spacing between the dies that is less than that of the thickness of the sheet. In this way, the compressive operation of the dies tends to reallocate by a squeezing motion material from the part of the sheet that is subjected to the negative clearance to a part that is not. In one exemplary form particular to fuel cell bipolar plates, the part of the sheet from which the material is moved is that which is adjacent to the part of the subsequently-formed bipolar plate that includes generally planar surfaces, such as channel walls and lands, while the part of the sheet to which the material is moved is that which is adjacent (or part of) the part of the subsequently-formed bipolar plate that includes generally bent surfaces, such as angled radii formed at the intersection of the walls and lands. Furthermore, the portions of the sheet that define the shape of the channels include walls and lands, where the former generally corresponds to the out-of-plane portion and the latter to the in-plane portion that will upon fuel cell formation be in substantial facing contact with the adjacent diffusion layers or MEA.

The tool—which in one form may be a pair of cooperatively-shaped dies (also called a punch and die) made to come together under pressure—can form the final shape of the bipolar plate. The introduction of a negative clearance into the tool takes advantage of the relative formability of the sheet or related workpiece when exposed to the compressive force of the tool such that portions of the sheet material are effectively squeezed or ironed away from one part of the sheet surface to another. Thus, by the present forming operation, selective movement of the material making up the thickness of the sheet from a generally planar part of the surface to the angled parts that make up the die radii (or bend radii) will help keep necking in and around the bent portion to a minimum. In one form, introducing no more than about 20% negative clearance between the dies for use on terrific stainless steels is sufficient to achieve the desired reduction in necking while keeping the load on the tool (often referred to as "press tonnage" or the like) and resultant die wear impacts low. As mentioned above, the present approach is suitable for both one-step and multi-step forming processes, the latter of which is discussed in U.S. Pat. No. 8,778,567 entitled A UNIQUE PRE-FORM DESIGN FOR TWO-STEP FORMING OF STAINLESS STEEL FUEL CELL BIPOLAR PLATES that is owned by the Assignee of the present invention and hereby incorporated by reference in its entirety.

According to another aspect of the invention, a method of preparing a bipolar plate for a fuel cell includes placing a substantially planar metal sheet into cooperative engagement with a tool and using one or more shaping steps to form the sheet into a substantially non-planar shape that has numerous reactant channels formed therein. The shaping is done such that a negative clearance is introduced into at least a portion of the sheet as a way to reallocate (such as by squeezing or the like) a portion of the stainless steel that makes up the sheet from a substantially planar portion to a substantially angled portion (for example, at or near the bend radii) of the subsequently-formed bipolar plate. In a preferred form, the sheet has a substantially constant thickness throughout at least the portion of its surface that corresponds to the bipolar plate.

According to yet another aspect of the invention, a method of preparing a fuel cell is disclosed. The method includes arranging an MEA to have an anode, cathode and membrane disposed between the anode and cathode such that reactants may be placed in fluid communication with their respective electrode, and then placing a metal bipolar plate that defines a plurality of reactant flow channels adjacent to each of the anode and the cathode such that upon operation of the fuel cell, reactants introduced from a fuel source and an oxygen source respectively can be delivered to the anode and the cathode through the reactant flow channels. The bipolar plates are formed by placing the sheet into cooperative engagement with a tool or related forming apparatus such that upon deformation of the sheet by the apparatus, the movement of at least a portion of the apparatus introduces a negative clearance into at least a portion of the sheet as a way to reallocate a portion of the stainless steel that makes up the sheet from a substantially planar portion of the reactant flow channels to a substantially angled portion of the reactant flow channels.

It will be appreciated by those skilled in the art that other components may make up the fuel cell, such as one or more gas diffusion layers (GDLs) that may be placed between the respective electrodes (i.e., anodes and cathodes) and the bipolar plates to provide one or both of a reactant flowpath and an electrical current path to an external load-consuming circuit. Likewise, it will be appreciated that functions shared by the GDLs and electrodes may be combined into hybrid structure. Thus, for example, the catalytic material may be formed on either or both of the GDL and a substrate used to define the anode and cathode. Furthermore, placement of the bipolar plate adjacent the anode or cathode may include having the respective GDL placed therebetween such that the outwardly-projecting lands of the bipolar plate are in intermediate contact with the electrodes via direct contact between the plate and the GDL on one side and the anode or cathode and the GDL on the other side. Within the present context, so long as such indirect contact maintains all of the reactant flow attributes between the plate and the respective electrodes, it is deemed to be adjacent.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
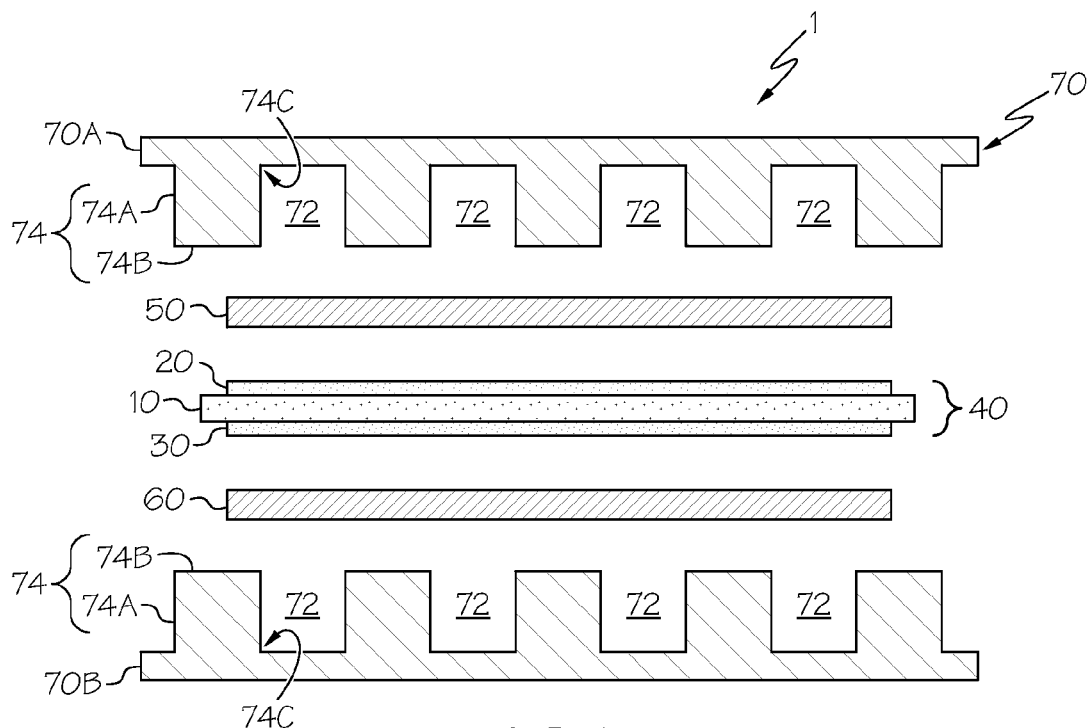
FIG. 1 is a simplified illustration of a partially exploded, sectional view of a portion of a fuel cell with surrounding bipolar plates.

Referring initially to FIG. 1, a partial, sectional view of a conventional PEM fuel cell 1 in exploded form is shown. The fuel cell 1 includes a substantially planar proton exchange membrane 10, anode catalyst layer 20 in facing contact with one face of the proton exchange membrane 10, and cathode catalyst layer 30 in facing contact with the other face. Collectively, the proton exchange membrane 10 and catalyst layers 20 and 30 are referred to as the MEA 40. An anode diffusion layer 50 is arranged in facing contact with the anode catalyst layer 20, while a cathode diffusion layer 60 is arranged in facing contact with the cathode catalyst layer 30. Each of diffusion layers 50 and 60 are made with a generally porous construction to facilitate the passage of gaseous reactants to the catalyst layers 20 and 30. Collectively, anode catalyst layer 20 and cathode catalyst layer 30 are referred to as electrodes, and can be formed as separate distinct layers as shown, or in the alternate (as mentioned above), as embedded at least partially in diffusion layers 50 or 60 respectively, as well as embedded partially in opposite faces of the proton exchange membrane 10.

In addition to providing a substantially porous flowpath for reactant gases to reach the appropriate side of the proton exchange membrane 10, the diffusion layers 50 and 60 provide electrical contact between the electrode catalyst layers 20, 30 and a bipolar plate 70 that in turn acts as a current collector. Moreover, by its generally porous nature, the diffusion layers 50 and 60 also form a conduit for removal of product gases generated at the catalyst layers 20, 30. Furthermore, the cathode diffusion layer 60 generates significant quantities of water vapor in the cathode diffusion layer. Such feature is important for helping to keep the proton exchange membrane 10 hydrated. Water permeation in the diffusion layers can be adjusted through the introduction of small quantities of polytetrafluoroethylene (PTFE) or related material.

Although shown notionally as having a thick-walled structure, bipolar plates 70 preferably employ a thin-walled structure (as will be shown and described in more detail below); as such, FIG. 1 should not be used to infer the relative thickness between the channels 72 and the plate structure that gives definition to such channels. Simplified opposing surfaces 70A and 70B of a pair of bipolar plates 70 are provided to separate each MEA 40 and accompanying diffusion layers 50, 60 from adjacent MEAs and layers (neither of which are shown) in a stack. One plate 70A engages the anode diffusion layer 50 while a second plate 70B engages the cathode diffusion layer 60. Each plate 70A and 70B (which upon assembly as a unitary whole would make up the bipolar plate 70) defines numerous reactant gas flow channels 72 along a respective plate face. Three-dimensional (i.e., out-of-plane) structure 74 is made up of walls 74A and lands 74B that separate adjacent sections of the reactant gas flow channels 72 by projecting toward and making direct contact with the respective diffusion layers 50, 60. Although bipolar plate 70 is shown (for stylized purposes) defining purely rectangular reactant gas flow channels 72 and structure 74, it will be appreciated by those skilled in the art that a more accurate (and preferable) embodiment will be shown below, where generally serpentine-shaped channels 72 (along with their respective generally planar apexes that correspond to the lands 74B) are formed.

In operation, a first gaseous reactant, such as hydrogen, is delivered to the anode 20 side of the MEA 40 through the channels 72 from plate 70A, while a second gaseous reactant, such as oxygen (typically in the form of air) is delivered to the cathode 30 side of the MEA 40 through the channels 72 from plate 70B. Catalytic reactions occur at the anode 20 and the cathode 30 respectively, producing protons that migrate through the proton exchange membrane 10 and electrons that result in an electric current that may be transmitted through the diffusion layers 50 and 60 and bipolar plate 70 by virtue of contact between the lands 74B and the layers 50 and 60.

Figure 2A:
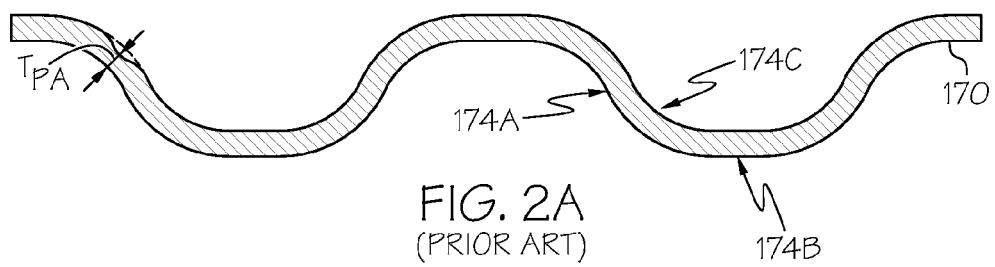
FIGS. 2A and 2B show a comparison between various sheets that have been subjected to a one-step forming process, including a referee sheet (FIG. 2A) that has been formed according to the prior art, and one that has been subjected to between about 13% and 20% negative clearance (FIG. 2B) according to an aspect of the present invention.
Figure 2B:
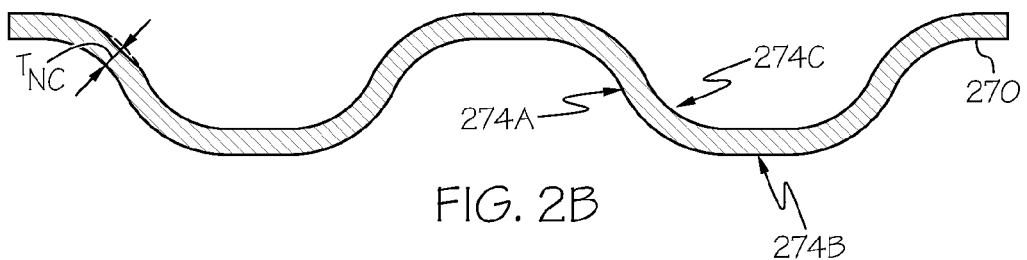

Referring next to FIGS. 2A and 2B, a comparison between the results of one-step forming a commercially-available stainless steel sheet 170, 270 into bipolar plates according to the conventional prior art approach (FIG. 2A) and the approach of the present invention (FIG. 2B) are shown. In one form, the sheets 170, 270 are made from ferritic stainless steel. The present inventors have determined that sheet 270 of the present invention is preferably between about 50 microns and about 200 microns in thickness, with an optimum range of between about 75 microns and about 110 microns. In particular, the inventors conducted testing and analysis on sheets with thicknesses of 75 microns (FIGS. 2A and 3A) and 110 microns (FIG. 3B). Referring with particularity to FIG. 2A, in this operation—where a generally continuous surface profile made up of side walls 174A is separated by lands 174B and bends (or radii) 174C—the die draw depth is set to 300 microns. In the present context, draw depth is the measure of channel (for example, channel 72 of FIG. 1) depth, which is essentially the measure of vertical deformation being imposed on a flat sheet of material, and does not typically include the material thickness as part of its measurement. As can be seen, significant thinning $T_{PA}$ (in particular, about 37.2% as shown) occurs at the intersections (i.e., bends or radii) 174C between the corresponding side walls 174A and lands 174B of sheet 170. In the present context, thinning and necking are different, where the latter represents a localized compromise in material properties such that it forms the initiation location or site of failure within a component such as the presently-disclosed bipolar plate. More particularly, the necking is caused by tensile stress, whereas a compressive stress state can cause wall thickness reduction, but will not cause localized necking. In contrast, thinning is a measure of the sheet thickness reduction that may or may not lead to failure. Significantly, the present inventors are of the belief that thinning caused by tensile loads differs from that caused by compressive loads, and that this difference is important to the success of the present invention. Negative clearance, as the present invention envisions, may increase thinning in the flat areas, but will eliminate necking, which tends to occur preferentially at or near the radii.

As mentioned above, such unacceptably high levels of thinning $T_{PA}$ or stretching may lead to necking and related fracture, especially for ferritic stainless steels, which are particularly prone due to their lower hardening curve than that of austenite or other stainless steels. The present inventors are likewise aware that a similar high likelihood of fracturing or weakening (neither of which are shown) will occur with the generally more robust austenitic stainless steels in situations where the draw depth may be greater (such as above about 400 microns). Thus, while much of the present disclosure is especially useful for terrific stainless steels (such as 439 stainless steel or the like), it will be appreciated by those skilled in the art that the invention discussed herein is also applicable to austenitic stainless steels, particularly in those situations where such greater draw depths may be required.

Figure 4:
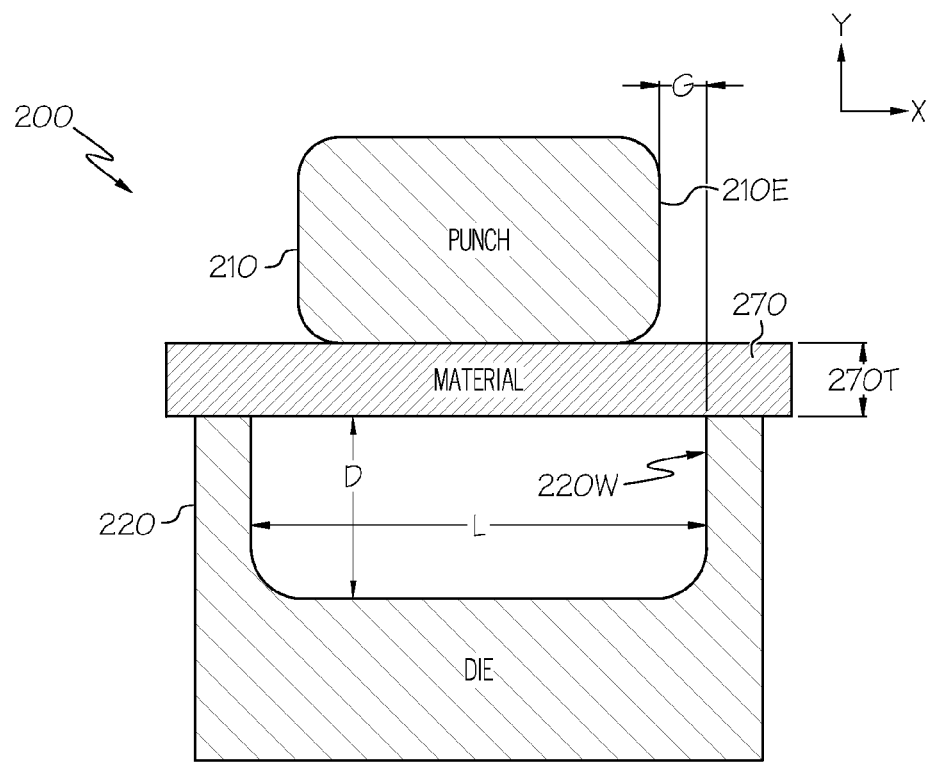
FIG. 4 shows the operation of punch-die tooling on a generally planar sheet of stainless steel, as well as how negative clearance is determined within the present context.

Referring with particularity to FIG. 2B in conjunction with FIG. 4, the results of a bipolar plate forming process from sheet 270 according to an aspect of the present invention are shown. The present sheet 270 is (as mentioned above) about 75 microns thick, and upon formation exhibited significant reductions in thinning $T_{NC}$ of about 31.6% (in absolute terms) that is a 5.6% improvement (or an approximately 15% improvement in relative thinning reduction) compared to that of FIG. 2A. As shown notionally in FIG. 4, plate-forming tool 200 includes a punch 210 and die 220 (where both halves together may be referred to in the alternate as a plurality of dies) where the former moves vertically back-and-forth relative to the latter through an appropriately-configured actuator (not shown). Traditional stamping and related blanking operations can be augmented by using negative clearance. In the present context, the term "negative clearance" means that the thickness of the sheet 270 being deformed is larger than the gap G between the lateral edge 210E of the punch 210 and the inner wall 220W of the die 220; this is illustrated in FIG. 4 where the "y" dimension (represented by sheet thickness 270T) is greater than the "x" dimension of gap G. As mentioned above—the cooperating action of the punch 210 and die 220 causes at least one of them to encroach onto the desired nominal thickness 270T of the sheet 270 as a way to squeeze or otherwise move portions of the sheet thickness 270T from one location (for example, on portions at or near planar surfaces that upon bipolar plate formation will remain away from bends and related radii) on the sheet 270 surface to others (for example, on portions of the surfaces that will upon bipolar plate formation be at or near bends and related radii). In one preferred form, the contact between the punch 210 and the sheet 270 that leads to the negative clearance takes place adjacent a substantial middle of sheet 270 that upon deformation will define wall 74A or channel 72 where deformation is much smaller than that of the adjoining bend 74C. As mentioned above, the introduction of a negative clearance into the tool 200 takes advantage of the relative formability of the sheet 270 when exposed to the compressive force of the tool 200 such that portions of the sheet material are effectively squeezed or ironed away from one part of the sheet surface to another. In one preferred form, the timing of the negative clearance control is placed near the end of forming process so that the initial stage of the forming process will not be adversely impacted. The result of using negative clearance as a way to reallocate portions of the material from one location on sheet 270 to another is that the maximum blanking force used by the tool 200 is higher than when used without; nevertheless, additional tooling is not required. Moreover, by keeping the amount of negative clearance relatively low (for example, less than 20%), any additional press tonnage required is more than offset by the gains in sheet formability.

In a preferred embodiment, the final form of the bipolar plate 70 of FIG. 1 that is made from precursor sheet 270 defines a serpentine shape with generally trapezoidal features to represent the lands 74B. As mentioned above, the sheet 270 is made from a ferritic or austenitic stainless steel alloy where corrosion-inhibiting materials (such as chromium, nickel, molybdenum, copper or the like) are added to the iron base. By way of example, the ferritic stainless steels (of which 439 stainless steel is an example) may contain chromium (possibly up to about 30 weight percent) with substantially no nickel. Likewise, an austenitic stainless steel may contain between about 15 and 26 weight percent chromium and about 1.5 to 22 weight percent nickel, where well-known examples include the American Iron and Steel Institute (AISI) Type 304 and Type 316 varieties.

By the present use of negative clearance, the selective movement of the material on sheet 270 from one location on its surface to another is such that the overall operation keeps a deviation from the nominal thickness in and around the intersection 74C of the subsequently-formed bipolar plate 70 to a minimum. In the present context, such selective movement corresponds to the localized transfer of discrete portions of the material that make up the initially-flat original sheet to adjacent sheet regions. In a more particular form (as discussed elsewhere herein), such discrete portions may coincide with those formed areas that define the channels 72. Significantly, the compressive action associated with the negative clearance promotes a suitable level of plastic deformation to facilitate the desired reallocation of material to the bending radii that are in and around the intersection 74C; this movement or feeding of additional material is useful in reducing the stretching or pulling of the metal from the wall area of the final bipolar plate 70. These features all help form a deeper channel 72, with more uniform thickness even with the less formable ferritic stainless steel. Moreover, it is not just thinning reduction benefits that are realized by the present invention's use of negative clearance, as its compressive action modifies the localized deformation from being purely tensile to a combination of tensile and compressive; this helps reduce or eliminate the incidence of the aforementioned necking. While the pursuit of very thin materials as a way to reduce component weight and cost continues apace, very thin foil (such as that with a thickness of 75 or fewer microns) has a limited amount of material volume available to achieve the target geometry and elongation of the fabricated component; this in turn has a tendency to make such foil less formable than thicker sheets. The approach discussed herein is particularly helpful in enabling the formability of such reduced material thickness foils.

Figure 3A:
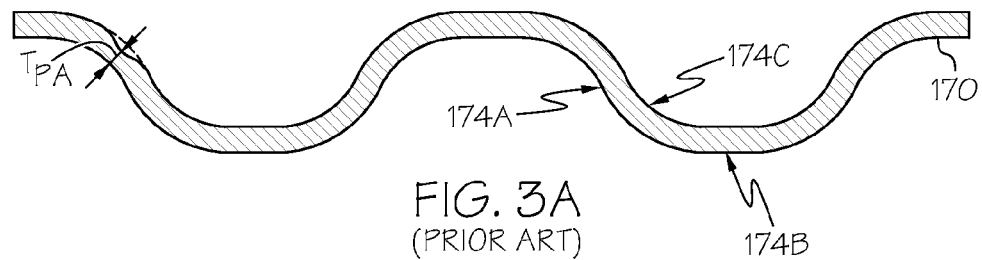
FIGS. 3A and 3B show a comparison between various sheets that have been subjected to a two-step forming process, including a referee sheet (FIG. 3A) that has been formed according to the prior art, one that has been subjected to between about 13% and 20% negative clearance (FIG. 3B) according to an aspect of the present invention.
Figure 3B:
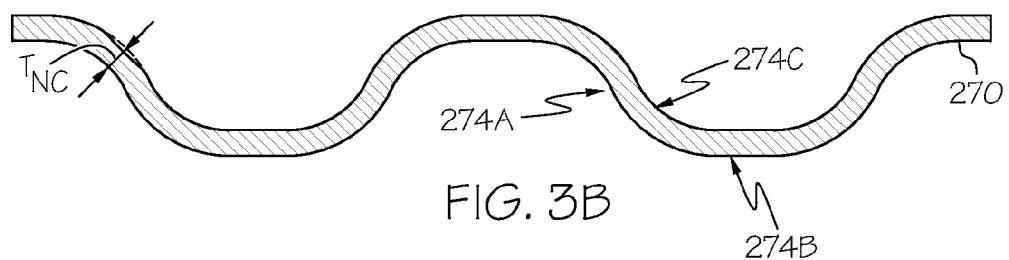

Referring next to FIGS. 3A and 3B, the benefits of the negative clearance approach of the present invention may be applied to a two-step forming approach as well, producing in the example depicted in FIG. 3B a serpentine-shaped plate that realizes a reduction in thinning from 28.7% $T_{PA}$ to 22.6% $T_{NC}$ (for a 6.1% absolute improvement, or an approximately 21% improvement relative to the prior art approach of FIG. 3A). In essence, the first step of the two-step approach pre-stretches (or pre-forms) the sheet 270 of material, and more particularly can be made to operate at fracture-vulnerable regions of the subsequently-formed bipolar plate 70. Referring with particularity to FIG. 3B in conjunction with FIG. 4, in the embodiment depicted, the draw depth D of the tool 200 used in conjunction with the first step is less than 300 microns (although it will be appreciated by those skilled in the art that other depths may be employed, depending on the desired dimensions of the resulting reactant channels), while the lateral channel repeat length L is 1.3 millimeters. Likewise, the draw depth D of the tool used to make the final bipolar plate shape (i.e., the second step) is 315 microns. Furthermore, in situations where austentic (rather than ferritic) stainless steel is used (for example, where one or both of the draw depths D is over about 400 microns), a similar preform tool can be used and different preform draw shapes can be obtained by adjusting the draw depth (also called punch stroke); such an approach may help to reduce tool redundancy and related costs.

In still another form, the channels 72 formed by the walls 74A lands 74B and bends 74C of the sheet 270 may include a large pre-form draw depth D to match final form depth as closely as possible (and will be compatible with the depth dictated by the depth of the die 220 of the tool 200); such a configuration will result in large plastic deformation. Likewise, a small punch radius may be used to stretch and deform the corners of the channels 72 that otherwise cannot sustain enough plastic deformation in the final form due to the low strain hardening rate (and consequent tendency to stretch out and become too thin) of ferritic stainless steel material. The disclosed invention will allow the sheet 270 being used to form the bipolar plate 70 to provide a substantially uniform thickness distribution at the end of final form channel 72 geometries without necking and fracture. Such an approach is suitable for both terrific and austenitic stainless steels.

In both the one-step and two-step forming approaches discussed above, significant reductions in localized thinning are shown relative to the approach of the prior art, with an absolute reduction in thickness of over 6.1% (for the two-step approach) and 5.6% (for the one-step approach) at a location that corresponded to bend 74C of the sheet for a draw depth D of 300 microns for a ferritic stainless steel sample with an initial sheet 270 thickness of 75 microns. This optimum result took into consideration various pre-form shapes and dimensions, including the land width of up to 0.5 millimeters, apex radii of curvature between 0.15 millimeters and 0.4 millimeters, and a depth of draw between 200 microns and 300 microns. Likewise, this optimum design was repeated for a final forming stage of 315 microns. Compared to the approaches of FIGS. 2A and 3A discussed above that did not employ any negative clearance in the tooling, the optimized thickness deviation reduction is significantly better. It will be further appreciated by those skilled in the art that while the comparative operation on the sheets of FIGS. 2 and 3 is for one-step and two-step forming, improvements may also be realized for any multi-step operations as well, and that such multi-step operations are deemed to be within the scope of the present invention.

Figure 5:
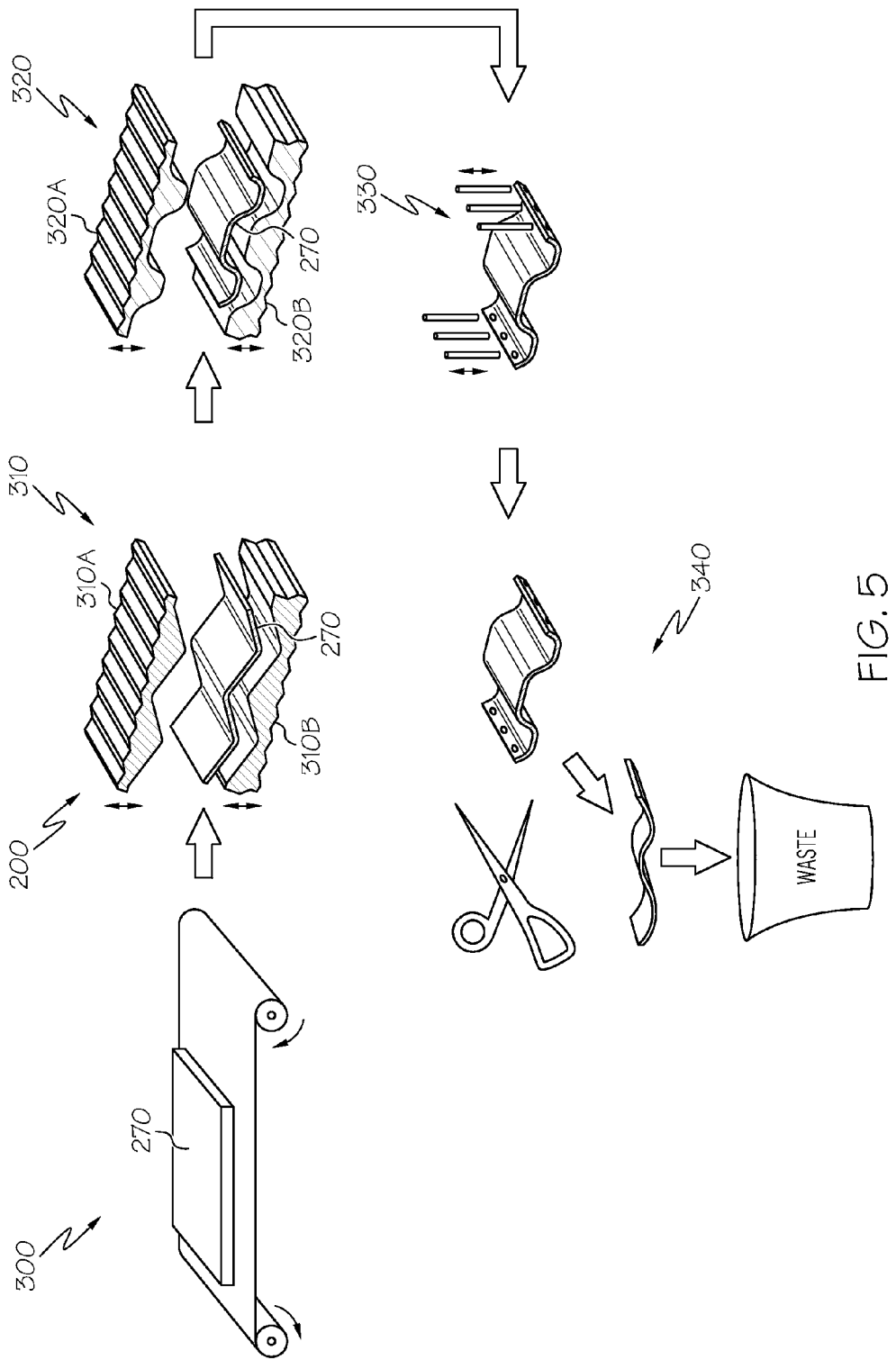
FIG. 5 shows the various steps used in the progressive formation of a bipolar plate according to an aspect of the present invention.

Referring next to FIG. 5 in conjunction with FIGS. 1 and 4, the steps 300 used to form a bipolar plate are shown. Initially, a pair of shaping steps 310 and 320 are performed. In the first shaping step 310, the generally flat sheet 270 is fed (such as by continuous conveyor or other known means) into the preform punch 310A and die 310B set; this is followed by a final shaping step 320 with corresponding-shaped punch 320A and die 320B. As will be appreciated by those skilled in the art, the punch and die sets corresponding to the two shaping steps 310, 320 are engineered for the particular part function and material type. Thus, alternate part designs or material type may require a slightly different shape/design, and such sets may be modified accordingly. From the shaping of steps 310 and 320, step 330 may be used to form additional bipolar plate 70 features, such as piercing of internal features, port openings or the like. Such pierced features may include header openings to distribute fluids to a finished stack assembly (not shown), while port (i.e., anode and cathode) openings provide pathways for reactant fluids to enter or exit each cell. Other features, such as openings to create or support the datum structure for assembly and other knockouts to facilitate assembly and integration (for example, to facilitate cell voltage monitoring) may also be formed. After that, an additional step 340 may be used to provide cutting, trimming, perimeter piercing or related separation of excess to be discarded. For example, the last station that corresponds to step 340 may be used to punch away the perimeter material to cut the finished plate 270 out of the strip for collection to a downstream assembly. As will be appreciated by those skilled in the art, an apparatus used to form the final shape bipolar plate 270 may include these and other various fabricating stages such that all are integrated into a single forming tool or machine. The radii cut into the general shape of the tooling is to prevent tearing of the fully-formed bipolar plates 70. All sections are blended and smoothed at corners to minimize stress concentration factors and related stress risers. As such, sharp transitions, corners or the like are avoided as being less than optimal for stamping operations such as those imparted in shaping steps 310, 320. As mentioned above, regardless of whether the forming takes place in one step or multiple steps, negative clearance is employed to reallocate surface material as a way to reduce the amount of thinning and potential necking.

A fuel cell made in accordance with an embodiment of the present invention may be part of a larger fuel cell stack, which may in turn form at least a portion of a propulsion system for a vehicle, such as car. The fuel cell stack may be configured to provide at least a portion of the motive or related propulsive needs of the vehicle. It will also be appreciated by those skilled in the art that other vehicular forms may be used in conjunction with the fuel cell stack; such vehicles may include a truck, motorcycle, aircraft, spacecraft or watercraft.

Unless otherwise indicated, all numbers expressing quantities are approximations that may vary depending on the desired properties sought to be obtained in embodiments of the present invention. As such, they may all be understood to be modified by the approximation "about". It is likewise noted that terms such as "preferably," "commonly," and "typically" are not utilized herein to limit the scope of the claimed invention or to imply that certain features are critical, essential, or even important to the structure or function of the claimed invention, but rather to highlight alternative or additional features that may or may not be utilized in a particular embodiment of the present invention. Furthermore, the term "substantially" is utilized herein to represent the inherent degree of uncertainty that may be attributed to any quantitative comparison, value, measurement, or other representation, and as such may represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of preparing a bipolar plate for a fuel cell, said method comprising:
    placing a metal sheet between a plurality of dies in a bipolar plate forming apparatus; and
    deforming said metal sheet to define said bipolar plate, said bipolar plate including a plurality of substantially planar portions adjacent at least one of a plurality of substantially angled portions to define a plurality of flow channels therebetween, wherein the metal sheet is deformed to define said bipolar plate by closing said plurality of dies together to introduce a negative clearance into at least one of said plurality of substantially planar portions of said bipolar plate to relocate a portion of said metal sheet from said one of said plurality of substantially planar portions into one of said plurality of substantially angled portions of said bipolar plate to reduce necking in one of said plurality of said substantially angled portions.

2. The method of claim 1, wherein said metal sheet comprises a ferritic stainless steel.

3. The method of claim 1, wherein said negative clearance is less than about 20%.

4. The method of claim 3, wherein said negative clearance is less than about 15%.

5. The method of claim 3, wherein said negative clearance is less than about 10%.

6. The method of claim 1, wherein said negative clearance forming does not take place at a beginning of a punch stroke of one of said plurality of dies.

7. The method of claim 1, wherein said flow channels comprise at least one wall and at least one land.

8. The method of claim 1, wherein said negative clearance is applied to a single-step forming process.

9. The method of claim 1, wherein said negative clearance is applied to a multi-step forming process.

10. The method of claim 1, wherein said substantially angled portion defined by said bipolar plate comprises a bend radii in said bipolar plate.

11. A method of preparing a bipolar plate for a fuel cell, said method comprising:

placing a substantially planar metal sheet into cooperative engagement with a tool, wherein said metal sheet defines a substantially constant thickness throughout the portion of its surface that corresponds to said bipolar plate; and using at least one shaping step to form said metal sheet into a substantially non-planar shape that defines a plurality of reactant channels therein, said at least one shaping step comprising introducing a negative clearance into a portion of said metal sheet forming a substantially planar portion of said bipolar plate to relocate a portion of said metal sheet to a substantially angled portion of by said bipolar plate to reduce necking in one of said plurality of said substantially angled portions.

12. The method of claim 11, wherein said at least one shaping step comprises stamping.

13. The method of claim 12, wherein said metal comprises ferritic stainless steel.

14. The method of claim 11, wherein a thickness of said sheet is between about 50 microns and 200 microns.

15. The method of claim 11, wherein said thickness of said sheet is between about 75 microns and about 110 microns.

16. The method of claim 11, wherein said introduction of a negative clearance produces a reduction in thinning of said bipolar plate by at least about 5% of the thickness of said sheet.

17. A method of preparing a fuel cell, said method comprising:

arranging a membrane electrode assembly to comprise an anode, a cathode and a membrane disposed between said anode and cathode; and placing a metal bipolar plate that defines a plurality of reactant flow channels therein in adjacent each of said anode and said cathode of said assembly such that upon operation of said fuel cell, reactants introduced from a fuel source and an oxygen source respectively can be delivered to said anode and said cathode through said reactant flow channels, said bipolar plates formed by:

placing a metal sheet in cooperative engagement with a forming apparatus; and deforming said metal sheet into said bipolar plate by movement of at least a portion of said apparatus, such that said movement introduces a negative clearance into at least a portion of said metal sheet forming a substantially planar portion of said reactant flow channels to relocate a portion of said metal sheet to a substantially angled portion of said reactant flow channels to reduce necking in one of said plurality of said substantially angled portions.

18. The method of claim 17, wherein said metal sheet comprises stainless steel.

19. The method of claim 18, wherein said stainless steel comprises ferritic stainless steel.

* * * * *